Figures 1, 2:
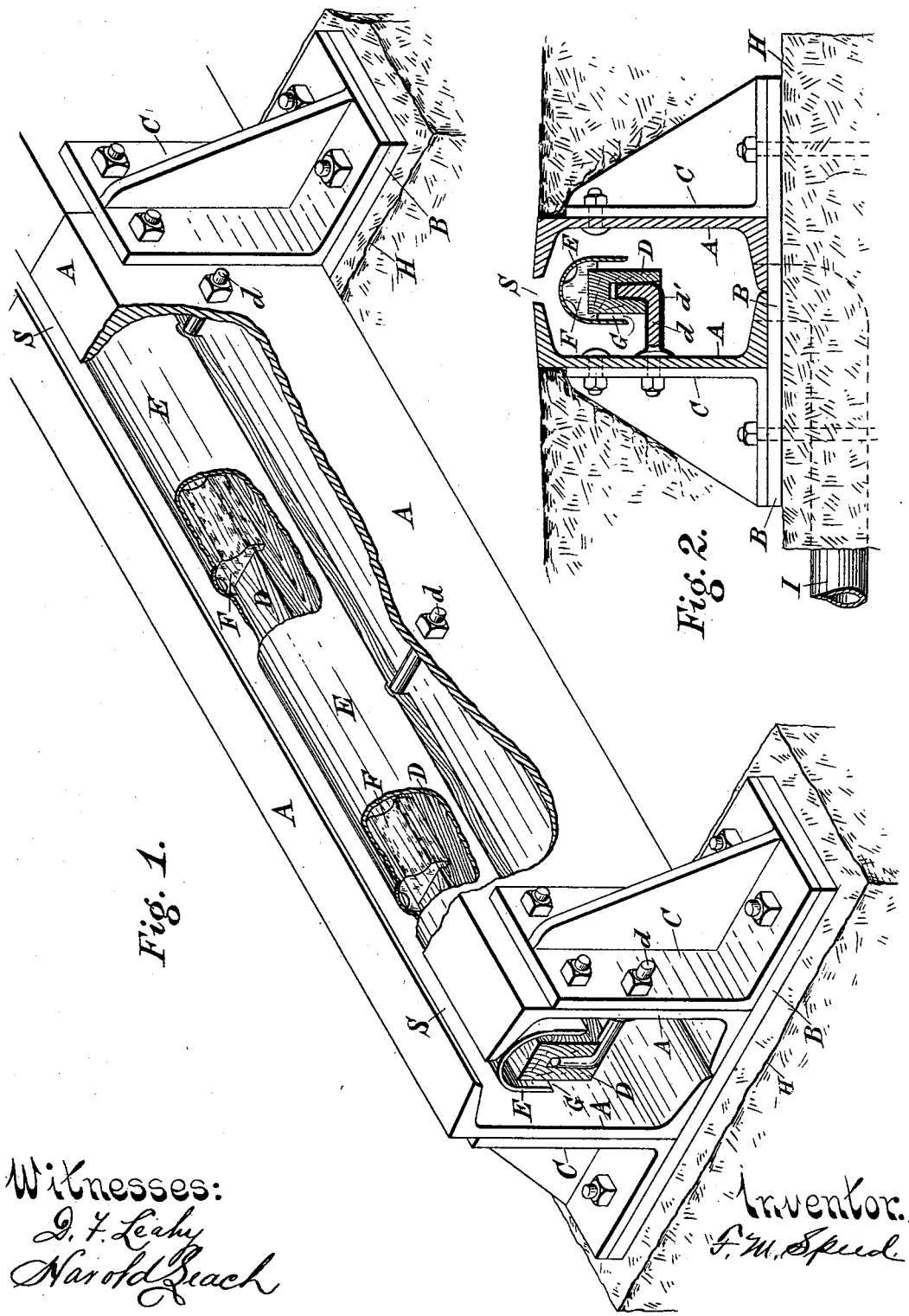

(No Model.)

F. M. SPEED.
ELECTRIC RAILWAY.

No. 403,786. Patented May 21 1889.

Witnesses:
Inventor.

UNITED STATES PATENT OFFICE.

FRANCIS M. SPEED, OF SAN FRANCISCO, CALIFORNIA.

ELECTRIC RAILWAY.

SPECIFICATION forming part of Letters Patent No. 403,786, dated May 21, 1889.

Application filed January 30, 1889. Serial No. 298,087. (No model.)

*To all whom it may concern:*

Be it known that I, FRANCIS M. SPEED, a citizen of the United States, residing in the city and county of San Francisco, and State of California, have invented an Improvement in Electric Railways, of which the following is a specification.

My invention relates to that class of electric railways in which the electric conductor is placed in a channel-way or conduit located between or outside of the rails.

It consists of a conductor forming a roof over the insulation thereof and a method and means of supporting and insulating said conductor, of which the following is a description, reference being made to the accompanying drawings, in which—

Figure 1 is an isometrical view, and Fig. 2 a sectional elevation, of a conduit including the several parts of my invention, which are:

E a semi-tubular metal electric conductor, its open side down, forming by its position and shape a roof over the insulation therein; F, insulators located in the peak of the roof thus formed; D, wooden insulating-strips, on which the insulators F rest, placed in the interior of the conductor; $d$, insulated metal brackets supporting the wooden insulating-strips from the conduit-walls C.

The object of my invention is to more perfectly insulate the conductor of electric railways.

The conduit herein shown consists of two channel-irons, A A, resting upon cement piers H, bolted on either side at intervals to braces C C, to hold them in position and uniformly maintain an open slotway, S, through which, by well-known devices, called "trolleys," electrical connection may be established between the conductor and a motor on a traveling vehicle above.

My invention is applicable to any of the various forms of electric-railway conduits that have these general features. Only one conductor is shown, though obviously two may be put in the same conduit, if required. The insulation of conductors of electric railways has hitherto been more or less imperfect, owing to the limited space and consequent short insulating interval between the conductor and conduit-walls. Moisture falls upon and streams over the short interposed exposed insulators employed and practically prevents the use of currents of a desirable voltage. The insulating resistance depending upon the length, cross-section, and nature of the insulating medium, increasing in the direct ratio of its length and decreasing in the ratio of its cross-section, to make the insulation more perfect it is necessary, first, to roof over and shield the insulators and their supports and keep them dry and free from dirt, and, second, to make the insulating interval (from the points where the conductor touches and rests upon the insulators and the point of support in the conduit-walls) as long as possible—in other words, to exclude moisture and make the surface of the insulation long and its cross-section small. I accomplish these objects by first making the conductor itself semi-tubular, as shown, constituting a roof over the insulation, and by placing the insulators in the peak or upper part of its interior, where they will be protected from falling moisture and dirt and kept dry and clean; second, by resting the insulators upon the upper surface of a strip of prepared wood or like insulating material running longitudinally throughout the interior of the conductor, where it will be also kept dry, and supporting said wooden strip on insulated brackets from the conduit-walls. The insulators are placed midway between the brackets and the brackets as far apart as the strength of the material will allow. The escape, if any, must take place, first, over the surface of the insulators; second, over the surface of the wooden strip, and, third, by the brackets to the conduit-walls. As the length of this dry path is the maximum and its cross-section a minimum obtainable under the conditions, it follows that the escape will be a minimum. The insulated brackets have their surfaces $d'$ from the conduit-walls inward to where they come in contact with the wooden strips covered with an insulating material.

Having thus described my invention, for which I desire Letters Patent, I claim—

1. In an electric-railway conduit, the combination which consists of a conductor having an inverted-U-shaped cross-section, its open side down, a strip of insulating material parallel with and in the interior of said conductor, insulated and supported from the conduit-walls, and insulators interposed between said conductor and said strip.

2. In an electric-railway conduit, the combination which consists of the walls A A of the conduit, the supporting-brackets $d\ d$, the strip D of insulating material, the insulators F, and the conductor E, substantially as and for the purpose described.

FRANCIS M. SPEED.

Witnesses:
D. F. LEAHY,
HAROLD LEACH.